Dec. 31, 1957   G. F. McCARTHY, JR   2,817,859
WIND AND SPRAY SHIELD
Filed April 4, 1955   2 Sheets-Sheet 1

INVENTOR
GEORGE F. McCARTHY JR.
BY Percy Freeman
ATTORNEY

Dec. 31, 1957  G. F. McCARTHY, JR  2,817,859
WIND AND SPRAY SHIELD
Filed April 4, 1955  2 Sheets-Sheet 2
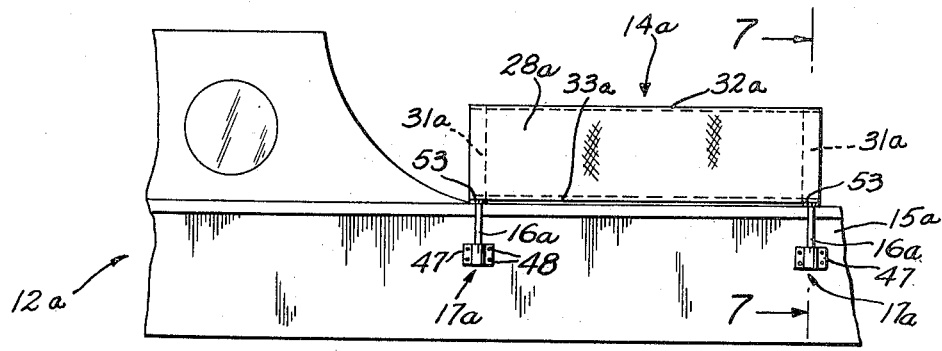
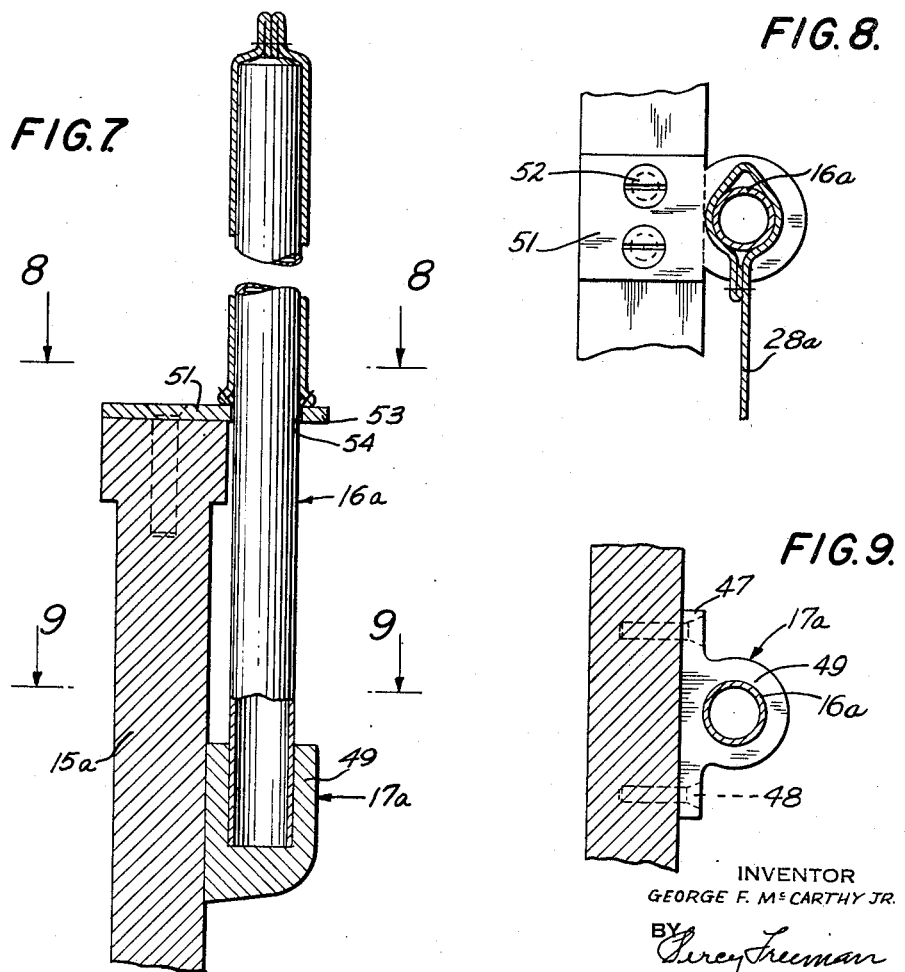
INVENTOR
GEORGE F. McCARTHY JR.
BY
Percy Freeman
ATTORNEY

2,817,859
WIND AND SPRAY SHIELD

George F. McCarthy, Jr., Freeport, N. Y.

Application April 4, 1955, Serial No. 498,897

3 Claims. (Cl. 9—1)

This invention relates generally to protective guards or shields for boats, and is particularly directed to shields or guards for sheltering the interior of a boat and its occupants from wind and spray.

The particular embodiment of the present invention, which is illustrated in the drawings, and which will be described hereinafter in greater detail, comprises generally a plurality of mounting members detachably secured to a boat gunwale spacedly therealong, upstanding support members carried respectively by said mounting members, and a flexible sheet extending between and supported by said support members to provide a shielding wall.

While there have in the past been presented various devices for sheltering or protecting boats from wind and spray, such devices, for numerous reasons, have not found public acceptance. In particular, wind and spray shields of the prior art have been relatively complicated in construction, unduly expensive to produce, and extremely difficult and time-consuming to erect or set up in operative position. Further, known devices of this general type have been found unseaworthy, readily damaged by the elements, and so constructed and arranged as to interfere with and impair normal fishing and other procedures. Even when not in use, the previous devices occupied considerable space.

It is accordingly a general object of the present invention to provide a protective device of the type described which overcomes the above-mentioned disadvantages, and effectively protects the interior of a boat and its occupants against wind, spray and the like, without hampering or hindering fishing or other procedures. The instant invention also contemplates the provision of a spray and wind guard which can be quickly and easily set up or erected at the first sign of a stiff breeze with a minimum of effort, by one of only ordinary skill, and without the use of any tools. The spray guard device of the instant invention is also adapted to be quickly removed and collapsed so as to occupy a minimum of space for convenient storage when not in use.

It is a further object of the present invention to provide a protective device having the advantageous characteristics mentioned in the foregoing paragraph, which is simple in construction and durable in use, capable of being employed with boats of all sizes, which is extremely seaworthy and highly resistant to deterioration and damage from the elements, and which can be manufactured, sold and maintained at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Fig. 6 is a partial, side elevational view showing a boat, and a slightly modified form of spray guard constructed in accordance with the present invention in operative condition on the boat.

Fig. 7 is a sectional view taken substantially along the line 7—7 of Fig. 6.

Fig. 8 is a sectional view taken substantially along the line 8—8 of Fig. 7.

Fig. 9 is a sectional view taken substantially along the line 9—9 of Fig. 7.

Referring now more particularly to the drawings, and specifically to Figs. 1–5 thereof, the embodiment of the invention illustrated therein comprises a boat, generally designated 12, and a pair of substantially identical spray guards 14, 14 set up in operative condition on opposite sides of the boat. As will appear presently in greater detail, the guards 14, 14 are secured, respectively, to the gunwales 15, 15 of the boat 12.

Figure 2:
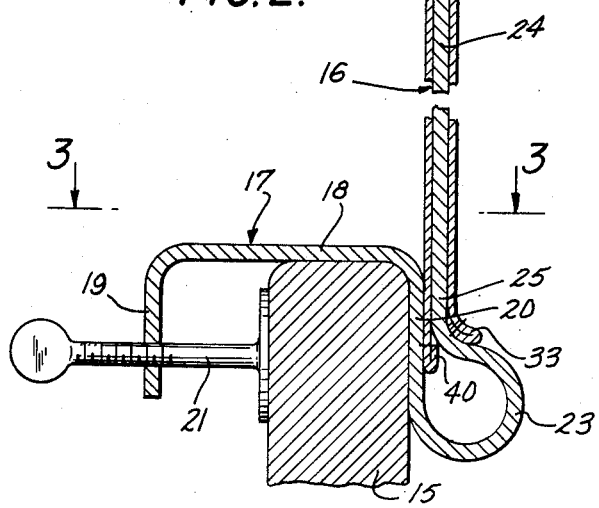
Fig. 2 is a sectional view taken substantially along the line 2—2 of Fig. 1.
Figure 3:
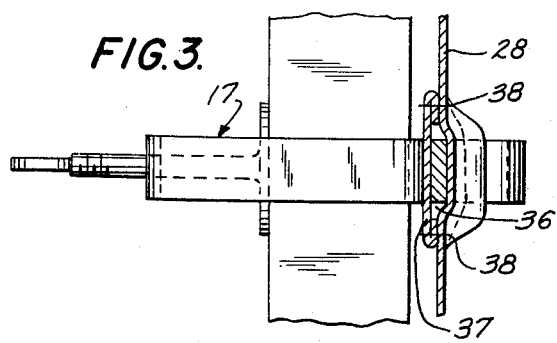
Fig. 3 is a sectional view taken substantially along the line 3—3 of Fig. 2.
Figure 4:
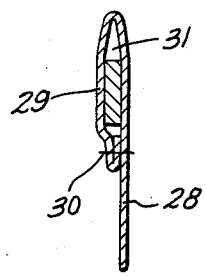
Fig. 4 is a sectional view taken substantially along the line 4—4 of Fig. 1.
Figure 5:
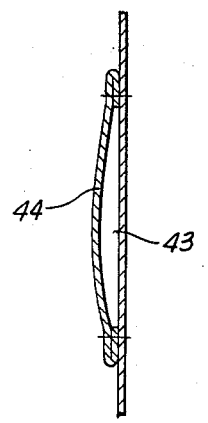
Fig. 5 is a sectional view taken substantially along the line 5—5 of Fig. 1.

Each of the spray guards includes a plurality of mounting members 17, best seen in Figs. 2 and 3, which are adapted for detachable securement at spaced points along the gunwales 15. Extending upwards from each of the mounting members 17, exteriorly of and upwards beyond the gunwales, is an upright support member or post 16.

More specifically, the mounting members 17 are all identical, and each includes a downwardly facing, generally C-shaped clamping element having an intermediate or bight portion 18 extending transversely across the upper edge of the gunwale, and depending inner and outer leg portions 19 and 20 extending from opposite ends of the intermediate portion on opposite sides of the gunwale. A headed thumb screw 21 extends transversely through each inner leg portion 19, in threaded engagement therewith, and is movable into and out of abutting engagement with the inner side of the gunwale 15 to maintain the leg 20 in abutting engagement with the outer side of the gunwale. Thus, each of the mounting members 17 comprises a generally C-shaped clamp adapted to be releasably secured to the gunwale.

The upstanding post or support member 16 is preferably formed integral with the outer leg 20 of the clamp 17, as illustrated, but may be fabricated separately and fixedly secured thereto by any suitable means, if desired. Further, the support member extends from the lower end of the leg 20, being bent upwards to define an almost complete loop 23 terminating in an elongate, straight upstanding portion 24. It will be noted that the lower portion 25 of the post 16, just above the loop 23, is disposed in adjacent relation with respect to the outer leg 20 of the C-clamp 17, and may resiliently abut the latter, as will appear presently.

Figure 1:
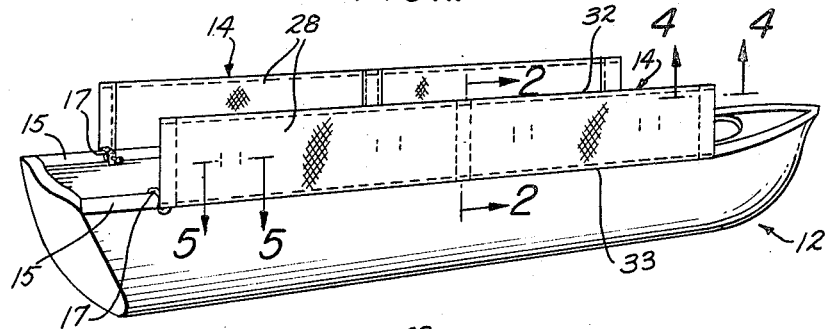
Fig. 1 is perspective view illustrating a boat having spray guard devices constructed in accordance with the present invention in operative condition on the boat.

Each of the spray guards 14 also includes a sheet 28 of duck or other flexible material, having suitable water-repellent and mildew-resistant characteristics. The sheet 28 is of any suitable length, according to the boat size and region desired to be protected. Opposite end portions 29 of the sheet 28 are folded inwards and secured, as by stitching 30 or other suitable means, to define vertically disposed interior tunnels or pockets 31 extending transversely of the sheet. The longitudinal edges or margins 32 and 33, upper and lower respectively, as seen in Fig. 1, may be hemmed so as to close the upper ends of the vertically disposed end pockets or tunnels 31, but leaving the lower ends or bottoms of the pockets open. If the length of the sheet 28 warrants the use of more than two mounting members 17 and support members 16, one or more additional, transversely extending pockets or tunnels, as at 36, may be formed on the sheet intermediate the end pockets. One such pocket is illustrated in the drawings, and is there defined by a vertically elongate strip or patch 37 disposed transversely of and in facing relation with respect to the inner surface of the sheet 28, with its opposite longitudinal edges secured to the sheet, as by vertical lines of stitching, 38, 38, and its upper end secured to the sheet by stitching 39. The lower end of the patch 37 may be hemmed, as at 40, and is free of or unsecured to the sheet. It will now be apparent, that the pockets 31 and 36, with the sheet 28 in its upstanding condition of Fig. 1, are all vertically disposed, having their upper ends closed and their lower ends open. If desired, additional tunnels or pockets 43 may be provided, preferably on the inner surface of the sheet 28, by one or more patches 44 secured along their margins to the sheet.

With the mounting members 17 clamped over the gunwale 15, three mounting members being employed for each spray guard 14 in the illustrated embodiment, the support members 16 will extend upwards beyond the gunwale at spaced points therealong. One of the sheets 28 is then arranged to engage the open lower ends of the pockets 31 and 36 over the support members 16, respectively. As best seen in Fig. 2, the lower end portions of the inner pocket walls engage snugly between the clamp leg 20 and lower post portion 25, being resiliently grasped therebetween, while the upper closed ends of the pockets are drawn into engagement with the upper free ends of the posts. By this construction, downward slipping of the sheet 28 on the posts 16 is prevented by the closed pocket tops, while upward movement of the sheet, as by wind or the like, is prevented by the snug reception of the inner pocket walls between the posts and clamps. Hence, with the mounting members 17 and their respective posts 16 properly spaced apart along the gunwale 15, the sheet 28 will be maintained fully distended in its upstanding or vertical condition extending along the gunwale exteriorly thereof and closely adjacent thereto.

Obviously, the mounting members 17 may be shifted to any desired position along the gunwales 15 to protect any desired region of the boat; and, the guards may be of greater or less length, as desired, employing a greater or lesser number of pockets, posts and mounting members, as required. The additional pockets 43 may be used as convenient receptacles for fishing supplies, personal effects, and the like.

In Figs. 6-9, inclusive, is shown a slightly modified form of wind and spray guard 14a, mounted on the gunwale 15a of a boat 12a.

The guard or shield 14a includes a plurality of brackets or mounting members 17a, two being illustrated in the drawings, an upstanding support or post 16a carried by each mounting member, and a flexible sheet 28a extending between and supported by the posts.

The mounting members 17a each includes a plate 47 adapted to be affixed, as by fasteners 48 to the exterior surface of the gunwale 15a, spaced below the upper edge thereof, and is formed with an outstanding, upwardly opening socket member or cup 49. Thus, the socket member or bracket 17a is receptive of the lower end of the upstanding support post 16a.

The post 16a is of sufficient length to extend upwards appreciably beyond the upper edge of the gunwale 15a. In this embodiment of the invention, the posts 16a are preferably of rod stock or tubular material (as illustrated), but may be of any other suitable, elongate material. In order to additionally rigidify each of the posts 16a, a plate or brace 51 is fixed in facing engagement with the upper edge of the gunwale 15a, as by fasteners 52 and has one end projecting outwards beyond the gunwale, as at 53, and spaced vertically above its respective bracket 17a. In addition, the projecting plate end 53 is formed with a through aperture 54 in axial alignment with the opening in the cup 49. The post 16a thus extends upwards through and beyond the aperture 54, best seen in Fig. 7, and is braced intermediate its ends by the plate 51.

The flexible sheet 28a is similar to the above described sheet 28, but is illustrated as being of shorter length, and hence requiring less pockets. In particular, the sheet 28a has its end portions folded over and secured to define transversely extending, end pockets 31a, and is hemmed along its upper and lower margins 32a and 33a so as to close the upper ends of the pockets while leaving their lower ends open. By this construction, the sheet 28a may be arranged so as to engage its end pockets respectively over the upper ends of the posts 16a. The posts will thus be received in the pockets with their upper ends in engagement with the closed upper ends or tops of the pockets, as seen in Fig. 7; and, the lower margin of the sheet 28a will be disposed in adjacent relation with respect to the plates 51 and gunwale 15a.

Of course, the sheet 28a may be removed by merely raising it off of the support posts, and the posts may be withdrawn from their respective mounting brackets 17a and plates 51a, when use of the guard is unnecessary.

In both of the above described forms of the present invention, the sheets 28 and 28a may be folded, along with their respective detachable hardware to occupy a minimum of space, as for storage or shipment.

From the foregoing, it is seen that the present invention provides a wind and spray guard which fully accomplishes its intended objects, and which is well adapted to meet practical conditions of manufacture and use.

Although the present invention has been described in some detail by way of illustration and example for purposes of clarity and understanding, it is understood that certain changes and modifications may be made within the spirit of the invention and scope of the appended claims.

Having thus described my invention, what I claim as new and desire to secure by Letters Patent, is:

1. A spray guard device for a boat adapted for attachment to said boat along the gunwale thereof, said device comprising in combination a flexible sheet having at least two spaced apart downwardly opening pockets and means for supporting said sheet substantially vertically in distended condition along said gunwale, said means including a plurality of upwardly opening socketed brackets attached to the exterior of said gunwale and a post having its lower end removably received in each said socket and extending upwardly therefrom beyond said gunwale and into a corresponding pocket of said sheet.

2. A device according to claim 1, in combination with a plurality of apertured brace members each fixed to said gunwale in spaced relation above and having its aperture in axial alignment with a respective one of said brackets for receiving the associated post, to thereby support said posts intermediate their ends.

3. A spray guard device for a boat, said device comprising at least two C-clamps adapted to be disposed in downwardly facing relation transversely across the upper edge of the boat gunwale and releasably secured to the latter, an extension on the outer end of each C-clamp and bent to extend upwards therefrom beyond said gunwale, a flexible sheet extending between said upward extensions, and at least two spaced pockets on said sheet having their upper ends closed and their lower ends open for respectively receiving said extensions, whereby said sheet is maintained in distended, upstanding condition along said gunwale to shelter said boat from wind and spray, the lower portion of each of said extensions being disposed adjacent to its respective C-clamp, the lower portion of said flexible sheet being snugly engaged between each of said C-clamps and the lower portion of its respective extension so as to be firmly grasped therebetween.

References Cited in the file of this patent

UNITED STATES PATENTS

| | | |
|---|---|---|
| 896,768 | Shelton | Aug. 25, 1908 |
| 1,956,799 | Jessen | May 1, 1934 |
| 2,493,833 | Reynolds | Jan. 10, 1950 |
| 2,618,285 | Heisig | Nov. 18, 1952 |

FOREIGN PATENTS

| | | |
|---|---|---|
| 27,593 | Great Britain | of 1902 |